(No Model.)
P. SWAN.
ANIMAL POKE.
No. 287,190. Patented Oct. 23, 1883.
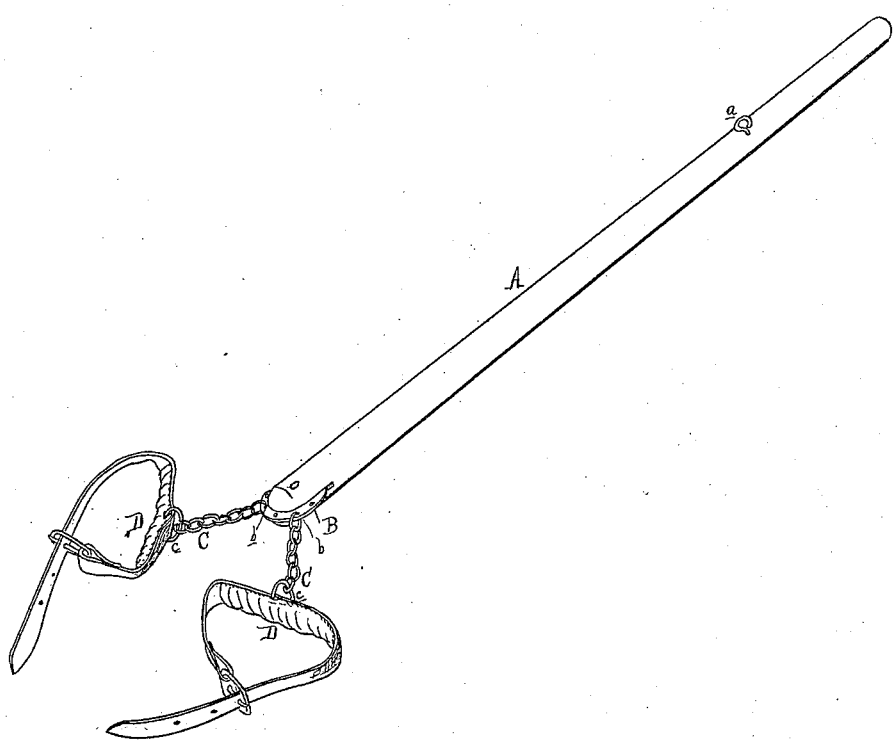

UNITED STATES PATENT OFFICE.

PELEG SWAN, OF LITCHFIELD, MICHIGAN.

ANIMAL-POKE.

SPECIFICATION forming part of Letters Patent No. 287,190, dated October 23, 1883.

Application filed April 26, 1883. (No model.)

*To all whom it may concern:*

Be it known that I, PELEG SWAN, of Litchfield, in the county of Hillsdale and State of Michigan, have invented new and useful Improvements in Animal-Pokes; and I do hereby declare that the following is a full, clear, and exact description thereof, reference being had to the accompanying drawing, which forms a part of this specification.

This invention relates to certain new and useful improvements in animal-pokes, designed to so control the movements of the animal, when in pasture, as to prevent his jumping the inclosing-fences or doing other injury to himself. Such devices have heretofore been constructed which in use would seriously injure the animal by the immobility of the parts; and the object of this invention is to so construct the device that a mobility of the parts will be had, by means of which no girdling of the horse's legs, to which it is attached, will follow its use, without interfering with the successful utility of the hamper.

In the accompanying drawing, which forms a part of this specification, A is a pole, usually denominated a "poke," provided with a staple or ring, $a$, or other suitable device, by means of which this end of the pole may be supported from the headstall or neckstrap worn by the animal. In the rear end of this pole is journaled a disk, B, and through this disk, near the edge thereof, are a series of holes, $b$, designed to engage with the shackle and chains C, one of which is provided for each of the front legs of the animal. This engagement may be secured by links, snap-hooks, or other devices that will allow of a free movement, and, preferably, which will allow of the engagement being changed from one hole to another, corresponding to the size and stride of the animal. To the opposite ends of these shackle-chains are secured the straps and pads D, by means of a ring, $c$, secured to the shackle-chain and to the pad-strap by being passed through a metallic pipe secured to the strap, between it and the pad, or by any other device that will allow a free movement of the pad-strap upon the ring.

In operation one of the padded straps is buckled around one of the forearms of the horse, above the knees, and the outer end of the pole supported as hereinbefore described. By the mobility of the parts a freer action of the legs is obtained, and any movement of the padded straps upon the legs is avoided, and unless this is done such movement will girdle or wear the hair off the legs at those points.

I deem it important that the disk be journaled in the rear end of the pole, as shown, and that it be provided with a series of holes, for by this construction not only is greater mobility of the parts attained, but the shackle-irons can be readily and easily changed from one hole to another, to correspond with the size and stride of the animal.

I am aware of Patent No. 270,843, and make no claim to the construction shown therein.

What I claim as my invention is—

1. An animal-poke provided with means of support, and shackles and a disk-plate journaled in the rear end of the poke, to which said shackles are pivotally secured, said disk-plate being provided with a series of holes, substantially as and for the purposes described.

2. An animal-poke wherein the shackle-chains are pivotally secured to padded leg-straps and to a swinging disk-plate journaled in the rear end of the poke, substantially as and for the purposes set forth.

3. An animal-poke consisting of a pole provided with means for supporting its free end, and with a disk-plate journaled in the rear end of said pole, a pair of shackle-chains pivotally secured to said disk, and a pair of padded leg-straps pivotally secured to said chains, substantially as set forth.

PELEG SWAN.

Witnesses:
E. SCULLY,
E. W. ANDREWS.